Patented Feb. 9, 1954

2,668,861

UNITED STATES PATENT OFFICE 2,668,861

METHOD FOR THE PREPARATION OF DIMETHOXYRESORCINOL

Theodore A. Geissman, Los Angeles, Calif.

No Drawing. Application July 30, 1951,
Serial No. 239,377

6 Claims. (Cl. 260—613)

This invention relates to a novel, efficient method for the preparation of dimethoxyresorcinol from certain derivatives of quinone. The compounds so produced will find utility as intermediates, from which can be prepared certain coumarone derivatives possessing physiological activities. More particularly, the dimethoxyresorcinol prepared by this method may be utilized in the synthesis of khellin, a compound possessing coronary dilator activity, according to the method of Clarke and Robinson: J. C. S., 1949, 302–307.

The method according to this invention, generally speaking, comprises reacting a quinone of the structure:

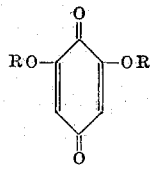

in which R is a reversibly etherifying group whose function is primarily the protection of the functional hydroxy groups during the reduction of the quinone structure as, for example, phenyl substituted lower alkyl groups, such as benzyl and benzhydryl radicals, with a lower alkanoic acid anhydride or preferably with a combination of a lower alkanoic acid anhydride and an alkali metal salt of that alkanoic acid as, for example, acetic anhydride and sodium acetate or propionic anhydride and potassium propicnate, under anhydrous conditions in the presence of zinc dust as a reducing agent at elevated temperatures, followed by treatment with a methyl derivative of a strong inorganic acid as, for example, dimethyl sulfate or methyl iodide, in the presence of alkali to prepare compounds having the general formula:

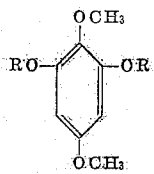

in which R is as given above.

The starting materials utilized in the method of this invention will be prepared by oxidation with nitric acid, according to the method of Robinson et al.: J. C. S., 1929, 74, of the corresponding 1,2,3-triethersubstituted benzene to form the 2,6-diethersubstituted quinone.

More particularly, the method according to this invention will be made apparent by the following reaction in which R is as above:

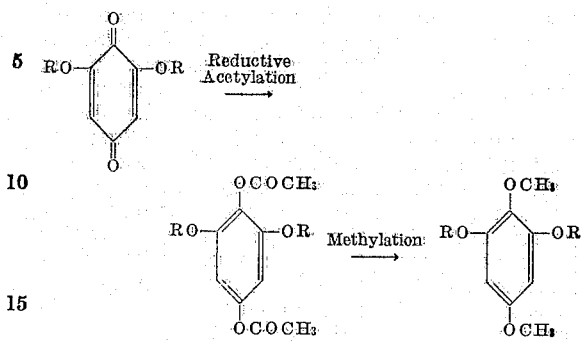

in which the diethersubstituted quinone is subjected to reductive acetylation to form the corresponding diacetoxy-dietherbenzene which upon methylation, using a methyl derivative of a strong inorganic acid in the presence of alkali, at elevated temperatures, replaces the acetoxy radicals by methoxy radicals.

The conversion of the diether groups may be readily accomplished, by usual techniques, such as hydrogenation in the presence of a palladium-carbon catalyst, to hydroxy groups if desired, in accordance with the method of Clarke and Robertson: J. C. S. 1949, 302–307. It may, however, be desirable to utilize the diether product directly in the synthesis of the physiologically active coumarone compounds, according to the method of Baxter, Ramage and Timson: J. C. S., 1949, S–30.

Alternately, the diether-substituted quinone may be directly converted, by means of a one-step operation, to the dimethoxy-dietherbenzene by subjecting the quinone to the action of a methyl derivative of a strong inorganic acid as, for example, dimethyl sulfate, methyl iodide or the like in the presence of alkali and a reducing agent, such as sodium hydrosulfite. This, it will be appreciated, effectively combines the two steps of the above-illustrated reaction, eliminating the need for the reductive acetylation step.

As more particularly illustrative of the method according to this invention will be the following preparation of 1,4-dimethoxy-2,6-dibenzyloxybenzene:

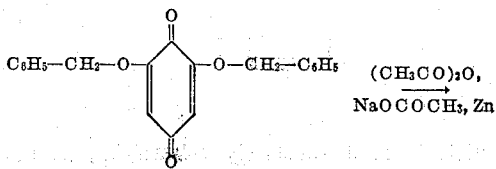

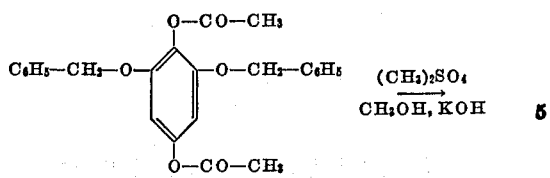

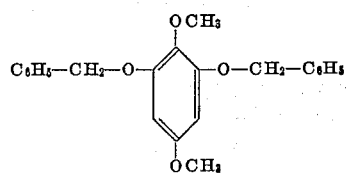

A mixture of 2,6-dibenzyloxyquinone (59 g.) and 30 g. of fuzed, anhydrous sodium acetate was heated with 400 ml. of acetic anyhydride on the steam bath. To this was added, with swirling, over a period of one-half hour (in approximately 2-3 g. portions) 50 g. of zinc dust. The reaction was slightly exothermic and the yellow color gradually disappeared. After the addition of the zinc the solution was boiled under reflux for approximately 20 minutes. The excess zinc was then removed by filtration and the filtrate was added to shaved ice to which was added the washings of the residual zinc with hot acetic acid. The ice water was then well stirred to break up lumps of precipitated acetoxy compound, and after the addition of more water the mixture was set aside to stand overnight in a refrigerator. The resulting precipitate of 1,4-diacetoxy-2,6-dibenzyloxybenzene was then filtered, washed well with water and dried. Recrystallization from acetone yielded a product with an M. P. of 151° C.

A mixture of 74 g. of 1,4-diacetoxy-2,6-dibenzyloxy-benzene and 600 ml. of methanol were placed in a 3-liter, 3-necked flask which was then warmed with stirring of the contents. To this was then added 200 ml. of dimethyl sulfate, after which there was added slowly and with stirring, a solution of 224 g. of potassium hydroxide in 800 ml. of 50% aqueous methanol to the refluxing solution. The initial, momentary darkening caused by the addition of alkyl rapidly disappeared until after the addition of about a third of the alkali, after which a permanent dark color developed which did not disappear upon the addition of a little more dimethyl sulfate. After the addition of the alkali had been completed, heating was discontinued and stirring was continued overnight. Distillation of the methyl alcohol, followed by dilution of the remaining solution with water, precipitated 1,4-dimethoxy-2,6-dibenzyloxybenzene. Filtration of this crystalline material, which had a greenish tinge probably due to a trace of quinol, followed by recrystallization from methyl alcohol-acetone and charcoaling, provided a crystalline product which had a melting point of 80° C.

What is claimed is:

1. The method of making a compound having the following formula:

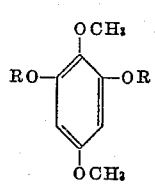

in which R is a reversibly etherifying group, which comprises reacting a quinone, of the structure:

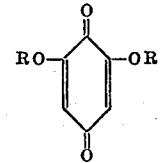

in which R is a reversibly etherifying group, with a lower alkanoic acid anhydride in the presence of a reducing agent and treating the resulting product with a methyl derivative of a strong inorganic acid in the presence of alkali.

2. The method of making a compound having the following formula:

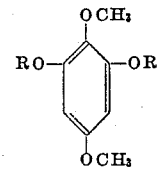

in which R is a reversibly etherifying group, which comprises reacting a quinone, of the structure:

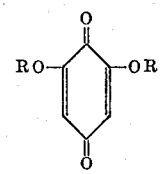

in which R is a reversibly etherifying group, with a lower alkanoic acid anhydride and the corresponding alkali metal salt of said alkanoic acid in the presence of a reducing agent and treating the resulting product with a methyl derivative of a strong inorganic acid in the presence of alkali.

3. The method of making a compound having the following formula:

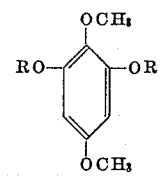

in which R is a phenyl substituted lower alkyl group which comprises reacting a quinone of the structure:

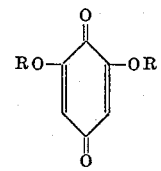

in which R is a phenyl substituted lower alkyl group with a lower alkanoic acid anhydride in the presence of a reducing agent and treating the resulting product with a methyl derivative of a strong inorganic acid in the presence of alkali.

4. The method of making a compound having the following formula:

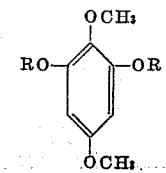

in which R is a phenyl substituted lower alkyl group which comprises reacting a quinone of the structure:

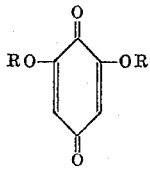

in which R is a phenyl substituted lower alkyl group with a lower alkanoic acid anhydride and the corresponding alkali metal salt of said alkanoic acid in the presence of a reducing agent and treating the resulting product with a methyl derivative of a strong inorganic acid in the presence of alkali.

5. The method of making a compound having the following formula:

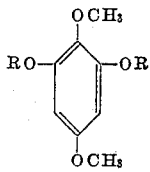

in which R is a phenyl substituted lower alkyl group which comprises reacting a quinone of the structure:

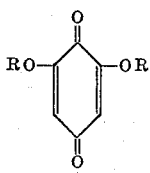

in which R is a phenyl substituted lower alkyl group with a lower alkanoic acid anhydride under anhydrous conditions in the presence of zinc dust as a reducing agent at elevated temperatures and treating the resulting product with a methyl derivative of a strong inorganic acid in the presence of alkali.

6. The method of making a compound having the following formula:

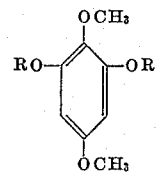

in which R is a phenyl substituted lower alkyl group which comprises reacting a quinone of the structure:

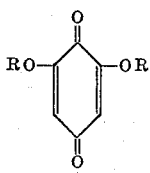

in which R is a phenyl substituted lower alkyl group with a lower alkanoic acid anhydride and the corresponding alkali metal salt of said alkanoic acid under anhydrous conditions in the presence of zinc dust as a reducing agent at elevated temperatures and treating the resulting product with a methyl derivative of a strong inorganic acid in the presence of alkali.

THEODORE A. GEISSMAN.

References Cited in the file of this patent

UNITED STATES PATENTS

| Number | Name | Date |
|---|---|---|
| 2,235,884 | Gottingen et al. | Mar. 25, 1941 |
| 2,632,025 | Grob | Mar. 17, 1953 |

OTHER REFERENCES

Revesta de la Academia de Aencias 30, 536 (1933).

Martin et al., Gazz. Chim. Ital. 72.208–15 (1942) C. A. N386–7.